United States Patent [19]
Lin

[11] Patent Number: 6,056,458
[45] Date of Patent: May 2, 2000

[54] COMPUTER KEYBOARD WITH Z-AXIS INPUT MEANS

[75] Inventor: Chien Pang Lin, Taipei Hsien, Taiwan

[73] Assignee: Dexin Corporation, Taipei Hsien, Taiwan

[21] Appl. No.: 09/291,011

[22] Filed: Apr. 14, 1999

[51] Int. Cl.[7] ....................................... B41J 5/28
[52] U.S. Cl. .................. 400/477; 400/472; 400/473; 400/480; 400/479; 400/479.1
[58] Field of Search .................... 400/477, 472, 400/473, 480, 485, 489, 490, 479, 479.1, 479.2; 341/22; 345/168; 361/680; 200/512

[56] References Cited

U.S. PATENT DOCUMENTS

| | | | |
|---|---|---|---|
| 4,847,452 | 7/1989 | Inaba | 200/512 |
| 4,920,237 | 4/1990 | Eardley et al. | 400/479 X |
| 4,920,343 | 4/1990 | Schwartz | 400/479.1 X |
| 5,156,475 | 10/1992 | Ziberman | 400/472 |
| 5,426,449 | 6/1995 | Danziger | 400/472 |
| 5,874,906 | 2/1999 | Willner et al. | 341/22 |

*Primary Examiner*—John S. Hilten
*Assistant Examiner*—Minh Chau
*Attorney, Agent, or Firm*—Rosenberg, Klein & Lee

[57] ABSTRACT

A computer keyboard with Z-axis input means is characterized in that at least one scrolling means compatible with that of a mouse, a cursor moving means and at least one mouse button are integrated on a keyboard with or without multimedia hotkeys. The novel keyboard consists of a traditional key matrix, a control unit, and a mouse equivalent unit. The mouse equivalent unit further consists of scrolling means, pointing means, and mouse button means, all of which are electricaly connected to the control unit. Through the all-in-one keyboard, user not only can perform typing task, operate mouse functions, but also scroll windows client area up and down, and left and right if a second scrolling means is provided.

2 Claims, 4 Drawing Sheets

COMPUTER KEYBOARD WITH Z-AXIS INPUT MEANS

FIELD OF THE INVENTION

The present invention relates to a keyboard with Z-axis input means, more particularly to a keyboard integrated with scrolling input means which is compatible to that of a mouse.

BACKGROUND OF THE INVENTION

In modem society, people process more tasks through personal computer, and keyboard and mouse have long been the most frequently used computer input means since the prevalence of personal computer. Recently, computer mice have been added a third axis and even a fourth axis for scrolling operation. These scrolling functions greatly increase the convenience and efficiency when applied under the windows oriented environment.

However, a conventional keyboard does not provide a Z-axis input means, it becomes inconvenient when mouse is not available or is not at nearby place.

It is the object of the present invention to provide PC user a keyboard with scrolling input means. Through the novel keyboard, user can access scrolling function in addition to those a traditional keyboard can provide.

The various objects and advantages of the present invention will be more readily understood from the following detailed description when read in conjunction with the appended drawing, in which:

DETAIL DESCRIPTION OF PREFERRED EMBODIMENT

Figure 1:
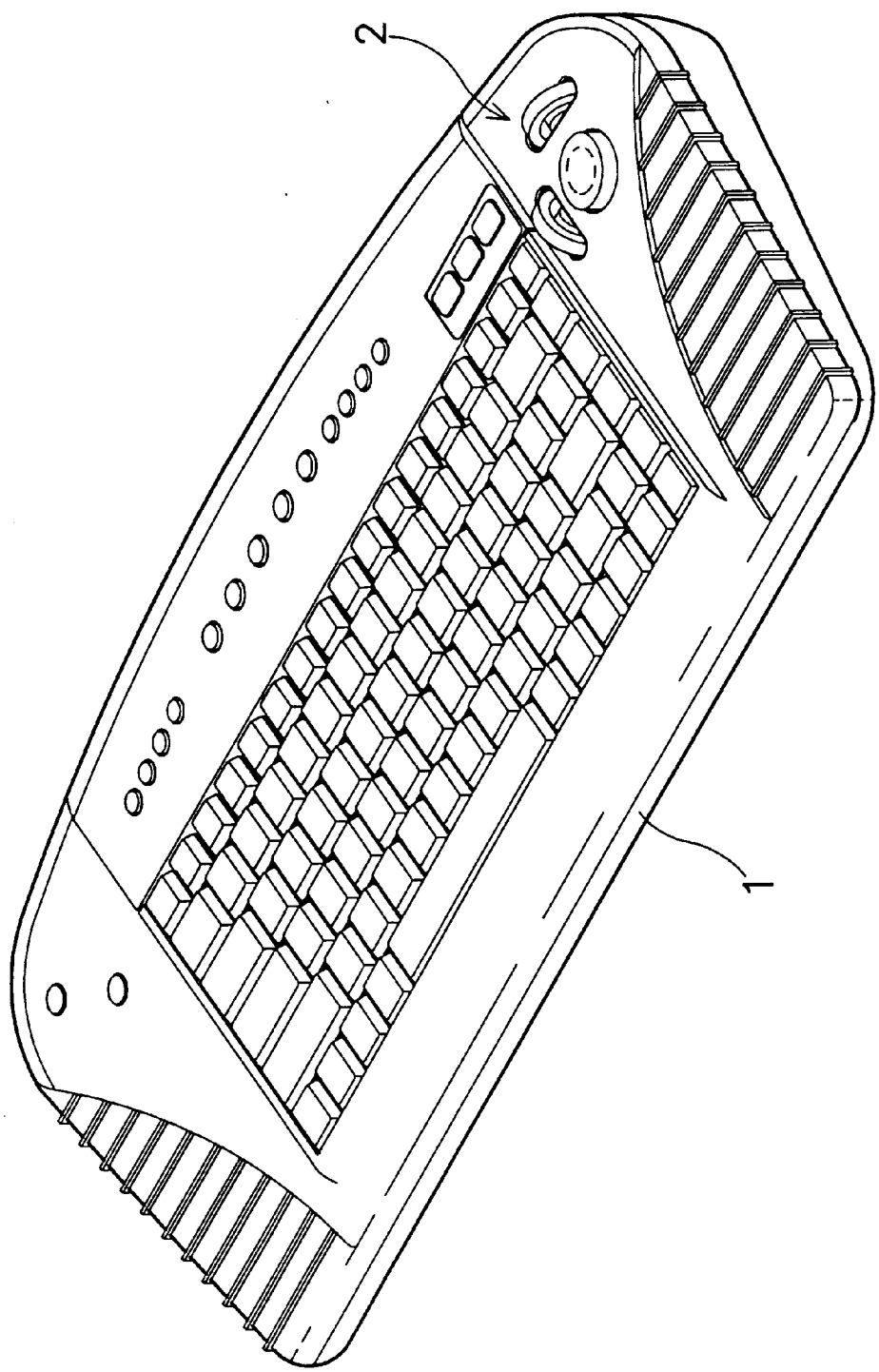
FIG. 1 shows the perspective view of the present invention.
Figure 2:
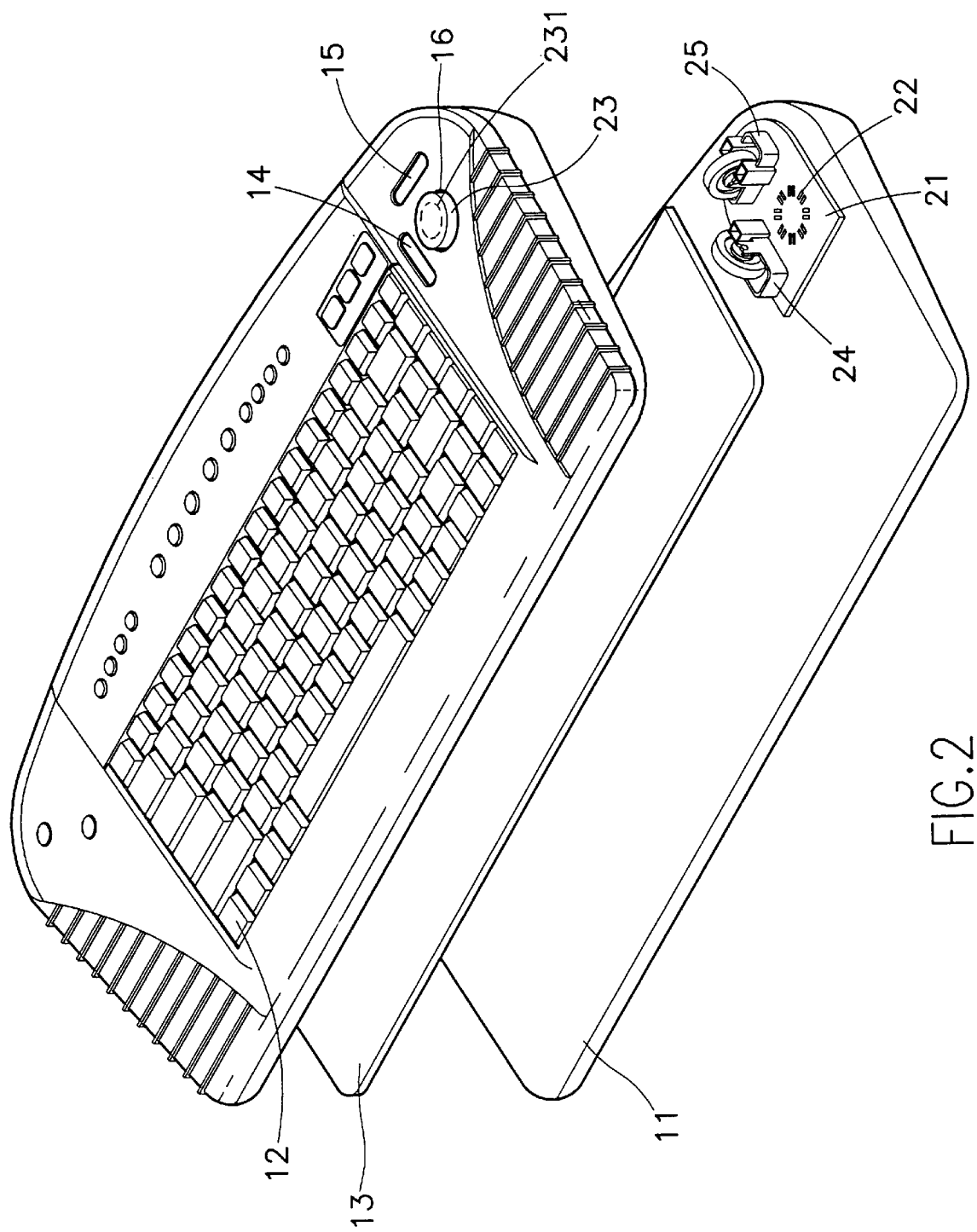
FIG. 2 shows the exploded view of the present invention.
Figure 3:
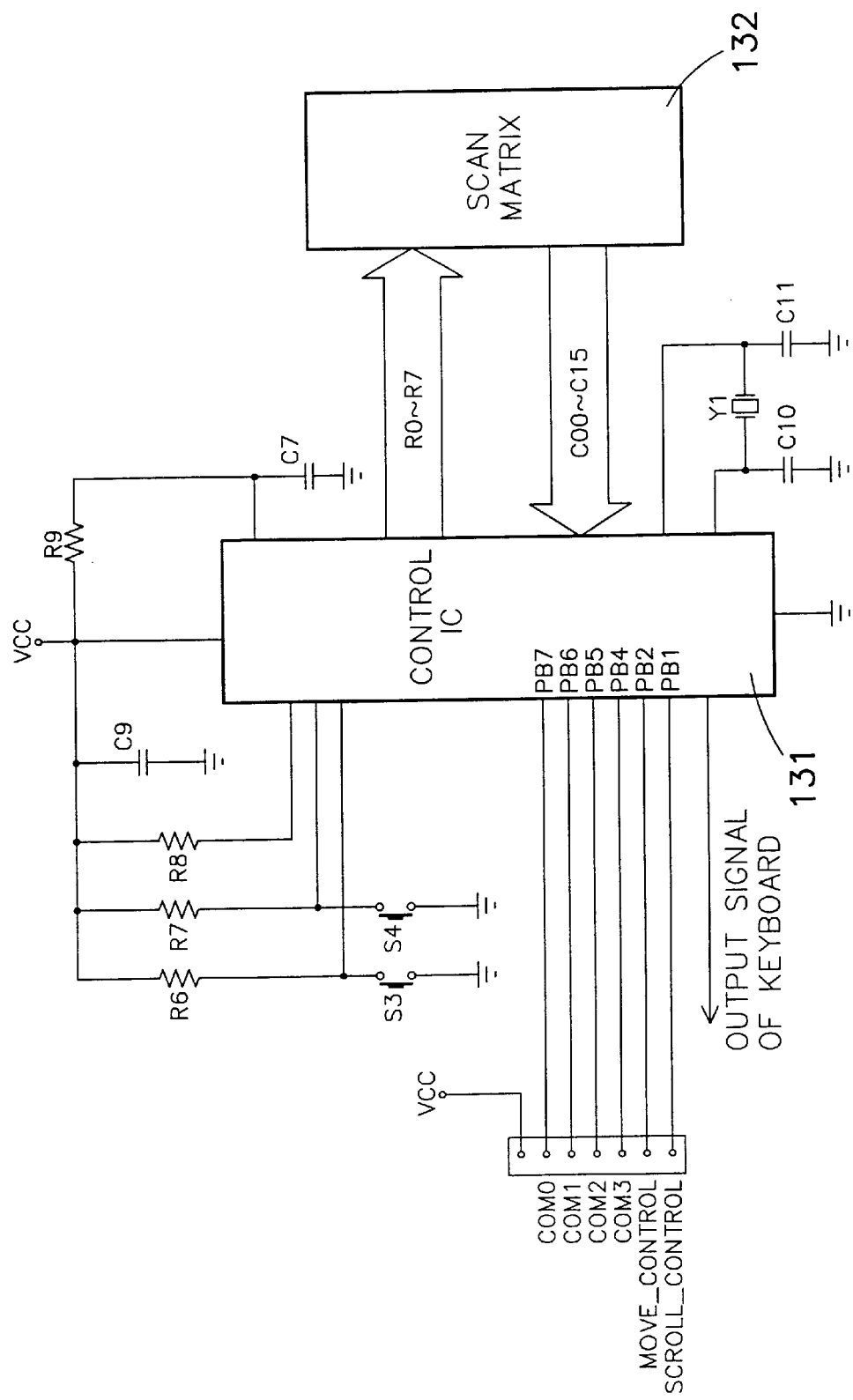
FIG. 3 shows the internal circuit diagram of the keyboard according to the present invention.

As shown in FIGS. 1 and 2, the novel invention device comprises a computer keyboard 1 and a Z-axis input means 2. The keyboard has a flat rectangular shape case 11, a plurality of keys 12 on top of the case 11, and a circuit board 13 within the case 11. As shown in FIG. 3, the circuit board 13 comprises circuit elements including a control unit 131 having a control IC U1, resistors R6–R9 and capacitors C7,-C9–C11, and a scan matrix circuit 132. The case 11 further comprises a first slot 14, a second slot 15 and a round hole 16.

Figure 4:
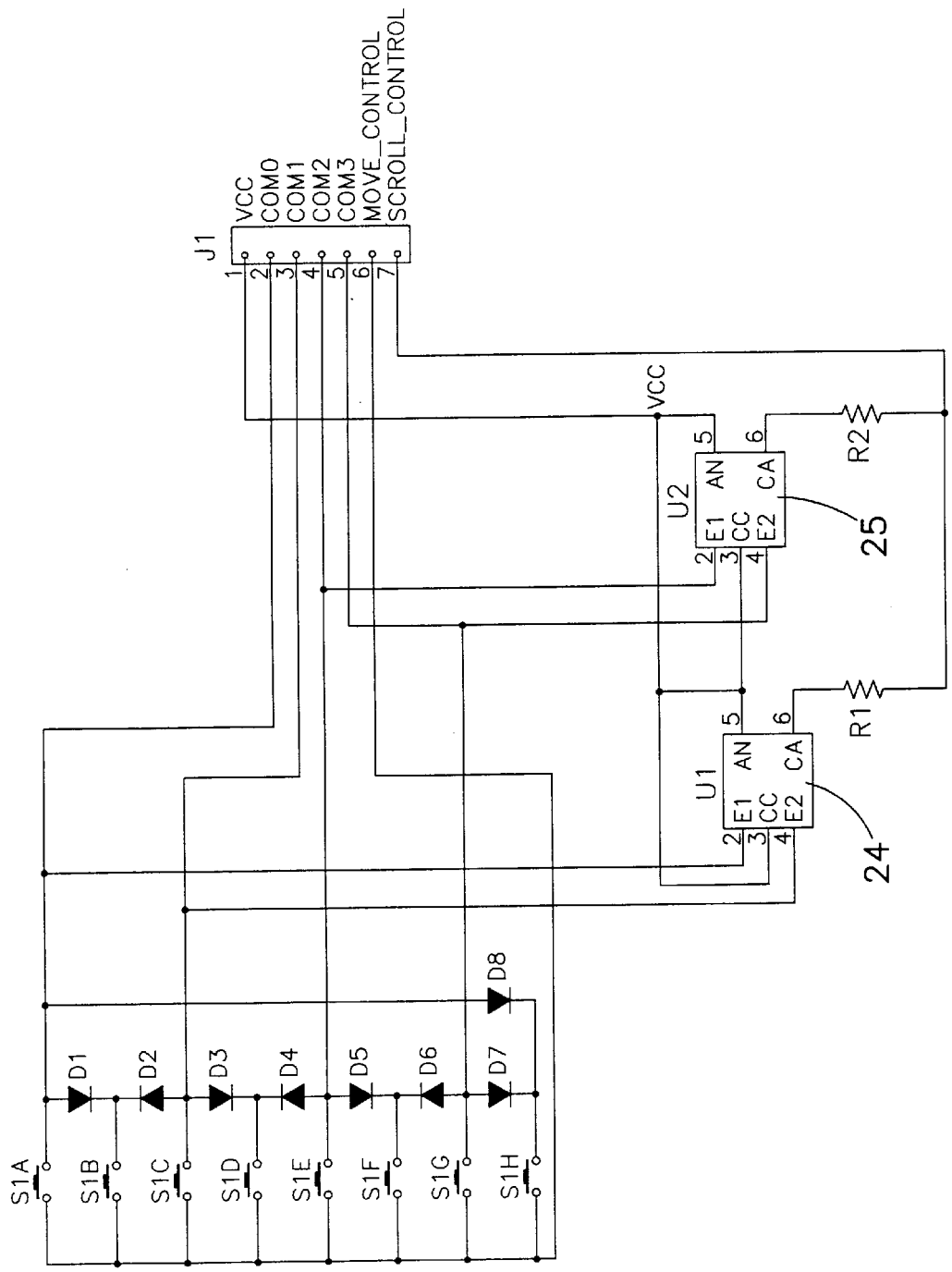
FIG. 4 shows the internal circuit diagram of the Z-axis input means according to the present invention.

As shown in FIG. 2 and FIG. 4, the Z-axis input means 2 comprises a base 21 at the place corresponding to the location of the round hole 16, and a plurality of carbon film switch 22 (S1A–S1H) arranged in circle pattern on the base 21.

A diode (D1–D8) is connected between adjacent two carbon film switches. The carbon film switches S1A, S1C, S1E and S1G are connected to the input port (PB4–PB7) of the control IC U1 of the internal control unit 131 within the keyboard 1 through the com0, com1, com2, com3 of a socket J1, respectively. A pressing unit 23 is placed upon the carbon film switch 22. Moreover, a carbon film 231 is arranged within the pressing unit 22 such that pressing the carbon film 231 will activate the corresponding carbon film switch and the generated signal will be sent to the control IC to determine the moving direction and distance of the cursor.

Moreover, a first scrolling means 24 and a second scrolling means 25 are provided on predetermined locations of the base 21. The activation element of those scrolling means can be rollers, joysticks or push button. The upper portion of the activation elements of both scrolling means 24 and 25 expose out of the corresponding slot 14 and 15, and the output signals thereof are connected to the input ports (PB4–PB7, PB1, PB2) of the control IC U1.

When the activation element of the scrolling means 24 (25) is tuned forward or backward (leftward or rightward), the IC U1 sends out signals of page up, page down (leftward or rightward page turning) upon receiving the output signals of the modules.

To sum up, by operating the scrolling means 24 (25) and the pressing unit 22 on the keyboard 1 and incorporating with the program of the control unit 131, the present invention can perform the operations of page up, page down (leftward and rightward page turning) and cursor movement in addition to a traditional keyboard operations.

Although the present invention has been described with reference to the preferred embodiment thereof, it will be understood that the invention is not limited to the details thereof. For examples, the scrolling means can be optical mechanical or switching type wherein mechanical type module sends the similar quadrant signal as the optical type, and the switching type sends signals with various voltage levels to the control unit. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A computer keyboard with integral mouse and scrolling functions, comprising:

a case supporting a plurality of keyboard keys;

a control circuit having a first input coupled to said keyboard keys;

a multidirectional switch coupled to a second input of said control circuit and formed by (a) a plurality of carbon film switch elements arranged in angularly spaced relationship, and (b) a pressing unit overlaying said plurality of switch elements for activating a respective one of said switch elements to provide a cursor movement signal for a direction corresponding to an angular position of said respective switch element; and, a pair of rotatably operated scrolling devices coupled to said second input of said control circuit, a first of said pair of scrolling devices providing page up and page down scrolling functions, a second of said pair of scrolling devices providing page left and page right scrolling functions, each of said scrolling devices including a rotatable element rotatable in each of two opposing directions to initiate a respective scrolling function.

2. The computer keyboard as recited in claim 1 where said second input of said control circuit includes six input terminals, each of said scrolling devices being coupled to a respective pair of said six input terminals in common with said plurality of switch elements, said pair of said scrolling devices being coupled in common to a respective other of said six input terminals.

\* \* \* \* \*